United States Patent

Wanlass

[15] 3,679,962
[45] July 25, 1972

[54] HIGH FREQUENCY PARAMETRIC VOLTAGE REGULATOR

[72] Inventor: Cravens L. Wanlass, Santa Ana, Calif.
[73] Assignee: Ambac Industries, Incorporated
[22] Filed: Jan. 12, 1970
[21] Appl. No.: 871,477

Related U.S. Application Data

[63] Continuation-in-part of Ser. No. 771,816, Oct. 30, 1968.

[52] U.S. Cl. ................................... 321/18, 321/2, 321/25, 323/60
[51] Int. Cl. .............................................. H02m 7/52, G05f
[58] Field of Search ................. 321/2, 11, 18, 25, 45 R, 45 S; 323/60

[56] References Cited

UNITED STATES PATENTS

| | | | |
|---|---|---|---|
| 3,325,716 | 6/1967 | Gomi | 321/2 |
| 3,460,020 | 8/1969 | Quinn | 321/2 |
| 3,559,032 | 1/1971 | Wanlass | 321/25 |
| 3,243,686 | 3/1966 | Forster | 321/45 |
| 3,341,766 | 9/1967 | Rhyne | 321/45 X |
| 3,371,263 | 2/1968 | Walz et al. | 321/25 |
| 3,403,323 | 9/1968 | Wanlass | 323/60 UX |
| 3,413,538 | 11/1968 | Hodges | 321/2 |
| 3,461,374 | 8/1969 | Rhyne | 321/18 |
| 3,490,027 | 1/1970 | Galetto et al. | 321/2 |

FOREIGN PATENTS OR APPLICATIONS 1,064,748  4/1967  Great Britain ........................ 321/18

OTHER PUBLICATIONS

IBM Technical Disclosure Bulletin, " Regulated Power Supply" Vol. 7, No. 10, p. 967, March 1965
Proceedings of National Electronics Conference, " The Magnetic Cross Valve and its Application to Subfrequency Power Generation," Vol. 5, pp. 450– 466, 1949

Primary Examiner—William H. Beha, Jr.
Attorney—Howson and Howson

[57] ABSTRACT

A parametric regulator in which an inverter is positioned between the input source of power and a parametric device to provide the parametric device with a high frequency input. The output of the parametric device is rectified and monitored by a sensing circuit which controls the frequency of the inverter to maintain the output voltage constant. A sensing and control circuit is provided which permits the use of conventional transistors in the inverter by establishing a proper timing pattern for the triggering of these transistors into and out of conduction.

3 Claims, 6 Drawing Figures

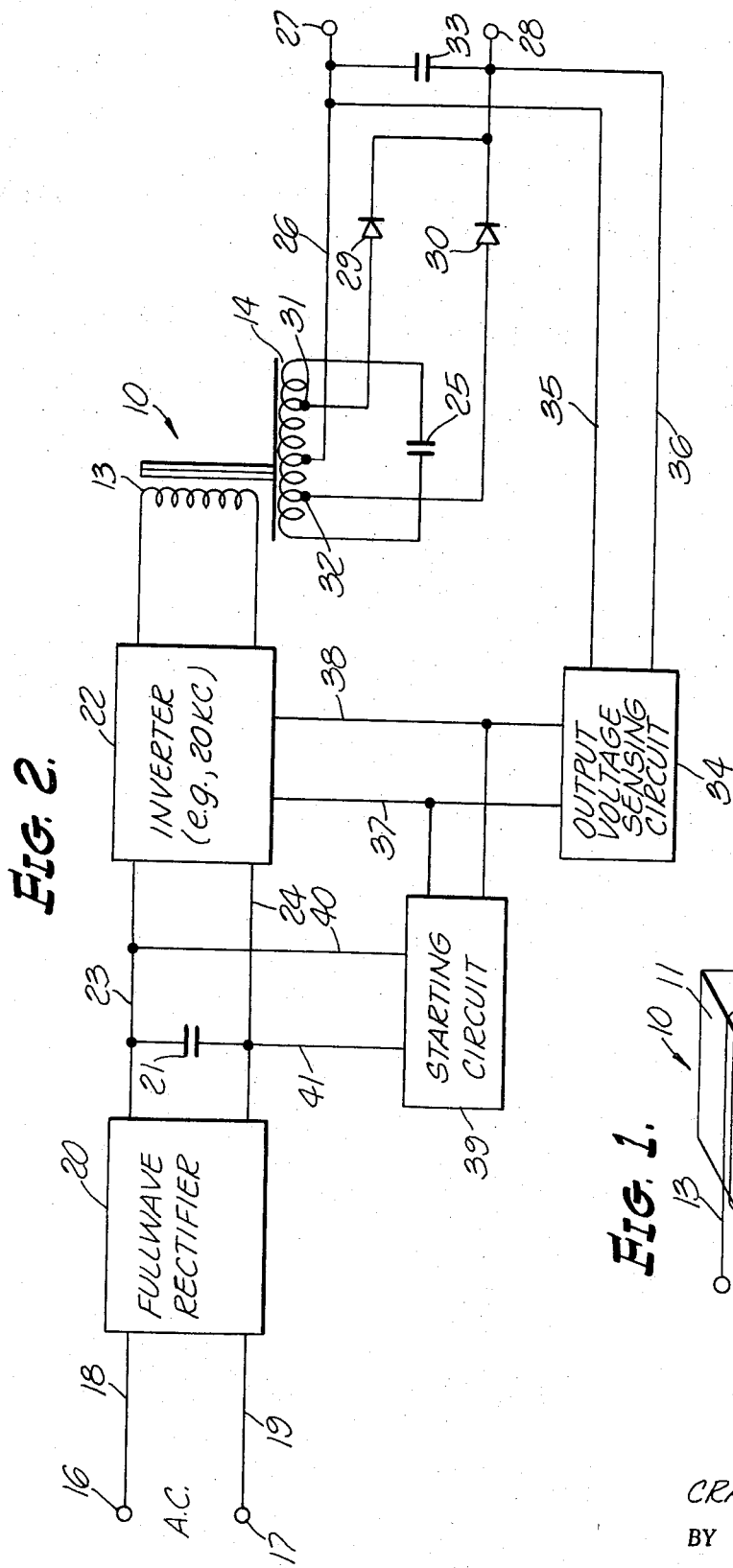
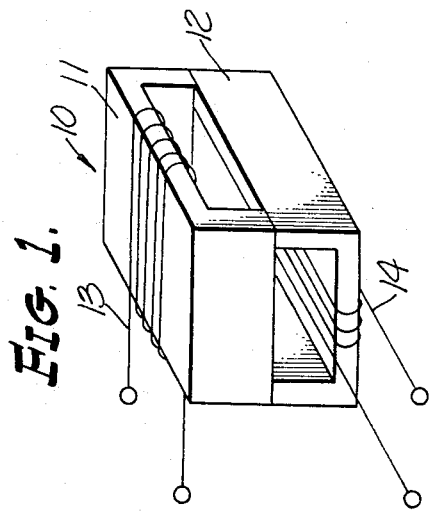

INVENTOR.
CRAVENS L. WANLASS
BY
Lyon Lyon
ATTORNEYS

HIGH FREQUENCY PARAMETRIC VOLTAGE REGULATOR

CROSS-REFERENCE TO OTHER APPLICATIONS

This is a continuation-in-part application of my application Ser. No. 771,816, filed Oct. 30, 1968, now abandoned.

In United States patent application Ser. No. 589,780, filed Oct. 25, 1966 now abandoned), and its continuation-in-part application, Ser. No. 821,933, filed May 5, 1969, by Leslie Kent Wanlass, and each assigned to the assignee of the present application, there is disclosed a voltage regulator employing a parametric circuit for providing a regulated output voltage from an unregulated AC input voltage. The parametric circuit in that application comprises an L-C circuit, the self-inductance of the load winding component of which is a variable inductor device of the type disclosed in U.S. Pat. No. 3,403,323 to Leslie Kent Wanlass, and also assigned to the assignee of the present application. The theoretical considerations and operating principles of this variable inductor and of the parametric circuit are described in detail in that application and that patent, the disclosures of which are incorporated by reference herein.

Briefly, the variable inductor disclosed in U.S. Pat. No. 3,403,323 comprises a magnetic core having a pair of windings thereon. The core is constructed so that it has four common regions or "legs" and two end or joining portions for magnetically coupling the common regions. The coils are wound on the end portions with their axes displaced at 90° so that normally there is no inductive coupling between them, and so that the flux components generated as a result of passing currents through the two windings are at all times in opposing relationship in two of the legs and an additive relationship in the other two legs. As a result of this construction, current in one of the windings, referred to as the control winding, generates a magnetic flux which controls the reluctance of the magnetic circuit encompassed by the second winding, referred to as the load winding, in such a manner that variations in this flux caused by variations in the current in the control winding cause the hysteresis loop of the magnetic circuit encompassed by the load winding to be effectively rotated, thereby varying the inductance of the load winding. Because of the construction of the device, the inductance varies at twice the frequency of an alternating current applied to the control winding.

This phenomenon is utilized in the parametric circuit disclosed in application Ser. No. 589,780 (now abandoned) and its continuation-in-part application, Ser. No. 821,933. The parametric devices disclosed in those applications and in this one differ from those shown in U.S. Pat. No. 3,403,323 in a number of respects which together distinguish parametric devices.

SUMMARY OF THE INVENTION

The following are differences between the parametric device of application Ser. No. 821,933 and the present invention and devices of U.S. Pat. No. 3,403,323, capacitor is coupled to the load winding of the variable inductor to form energy storage or tank circuit, which is normally a resonant circuit. Energy is transferred to the resonant or tank circuit by pumping the control winding with an alternating current of the same frequency as that to which the resonant or tank circuit is tuned, that is, the output frequency. Once the parametric circuit builds up to its stable oscillating point, variations in magnitude of the pumping source do not appreciably effect its output. Therefore, by coupling the line to be regulated to the control winding of the inductance device, a regulated, almost perfect sine wave, displaced 90° in phase with the input, can be taken from the resonant or tank circuit. Since there is no direct transformer coupling between the windings, the device serves as a bilateral filter, removing transients and noise generated in either the line or the load.

While the described parametric regulator is extremely satisfactory where the frequency of the input voltage is relatively constant, its output is frequency sensitive. The output is also to some extent sensitive to changes in load. Moreover, the regulator, while requiring less magnetic material than conventional devices, nevertheless requires a substantial amount of copper to form the windings. The capacitor must also be rather sizable. The device is therefore somewhat bulky, heavy, and expensive.

Common to the variable inductor of U.S. Pat. No. 3,402,323, but different from other prior art is the characteristic variation of self-inductance at twice the frequency applied to the control winding of the parametric device which produces an output frequency in the load winding the same as the input frequency.

According to the present invention, a closed loop parametric regulator is provided which is not sensitive to either frequency or load changes. In addition, the amount of magnetic material and windings required is greatly reduced, as is the size of the capacitor necessary. Consequently, the circuit is compact, lightweight and inexpensive. These advantages are obtained by converting the input voltage to be regulated to a high frequency voltage by means of an inverter or the like and applying the output of the inverter to a parametric device of the type described. The use of the high frequency input permits a substantial reduction in the size and weight of the core and in the number of turns required, and in the size of the capacitor required. The closed loop feature is provided by sensing the output voltage and controlling the frequency of the inverter in accordance therewith.

The closed loop operation of the present invention is also easily constructed to permit the system to achieve even better performance. For example, a typical inverter circuit exhibits a large switching power loss because of the fact that a conducting element such as a transistor has a delay associated with its turn off while the non-conducting element has no substantial delay associated with its turn on. Consequently, both elements can be conducting at the same time resulting in a high short circuit current and substantial power loss. In addition, these elements generally have a poor frequency response so that there is a significant switching time even after the delay is over. The short circuit currents often burn out the transistors or significantly reduce their life, as well as reduce the efficiency of the circuit.

To overcome these problems, special high frequency transistors with minimum delay and switching time are employed. These transistors are, however, very expensive. Because of the unique properties of the parametric device utilized in this invention, it is possible to use the cheaper transistors and control them in such a manner that they do not simultaneously conduct, i.e., by delaying the turn on of the non-conducting transistor until the conducting transistor is turned off. This is possible because of the insensitivity of the parametric device to the input wave shape of the input voltage.

It is therefore an object of the present invention to provide a closed loop parametric voltage regulator which is compact, lightweight, efficient and inexpensive.

It is also an object of the present invention to provide a closed loop parametric voltage regulator which is insensitive to changes in the input frequency or any other parameter affecting the output voltage value.

BRIEF DESCRIPTION OF THE DRAWINGS

FIG. 1 is a perspective view of a variable inductor useful in the voltage regulator of the present invention;

FIG. 2 is a schematic diagram of a first embodiment of a voltage regulator according to the present invention;

DESCRIPTION OF EMBODIMENTS OF THE INVENTION

Figure 3:
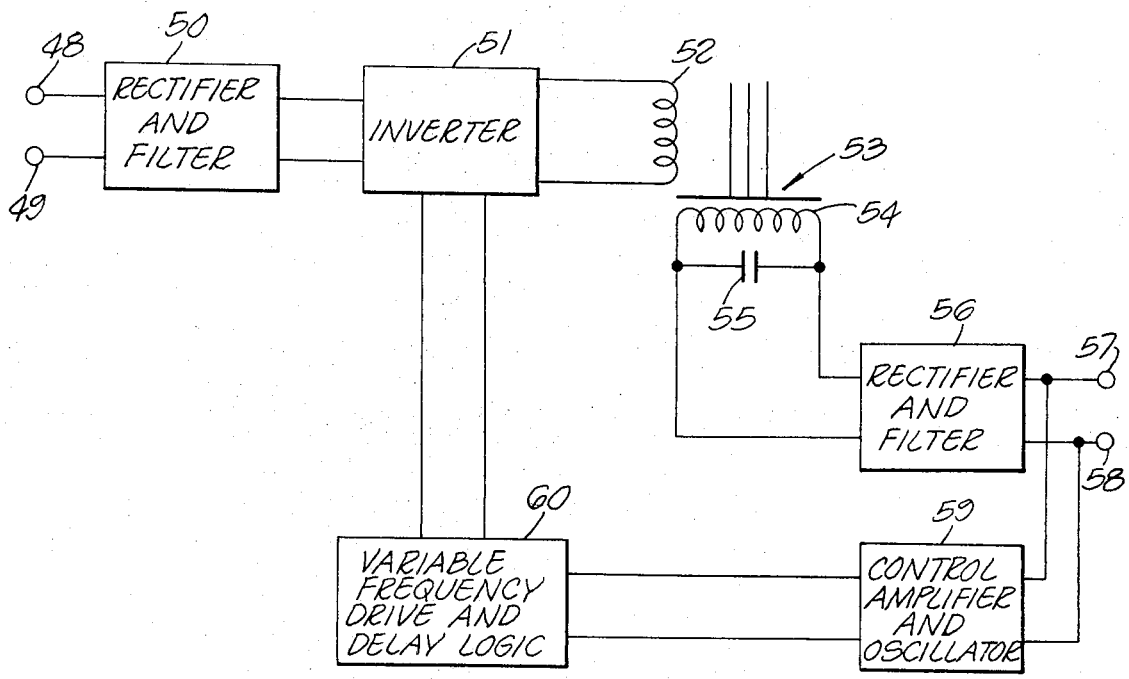
FIG. 3 is a schematic diagram of a second embodiment of a voltage regulator according to the present invention.

In the drawings, the convention adopted in the aforementioned patent and application for indicating a core according to the teachings of U.S. Pat. No. 3,403,323 are followed, that is, such a core as indicated by the use of a T-shaped iron symbol. While any of the various core structures illustrated and described in that patent could be used in this invention, the preferred construction is similar to that shown in FIG. 7 of the patent. An inductor utilizing such a core is shown in FIG. 1. The inductor 10 comprises a core made up of two C-cores 11 and 12, rotated 90 degrees from each other and joined at their bases, as shown in FIG. 1. The core 11 has a winding 13 wound thereon while the core 12 has a winding 14 wound thereon, the windings 13 and 14 being preferably at right angles.

Turning now to FIG. 2, an unregulated AC input voltage is applied to input terminals 16 and 17. These terminals are connected by conductors 18 and 19 to a full wave rectifier 20, the output of which is filtered by a capacitor 21 and applied to an inverter 22 by lines 23 and 24. The inverter can be of any conventional type, such as those employing silicon controlled rectifiers or transistors which serves to produce an alternating current output, typically in square waveform, in response to a direct current input. The circuitry of the inverter is not illustrated or described as such circuits are well known to those skilled in the art. The output frequency of the inverter 22 may, for example, be 20 kilocycles per second. If desired, a suitable frequency converter may be used in place of the rectifier 20 and inverter 22.

The output of the inverter 22 is applied to the control winding 13 of a variable inductor such as that shown at 10 in FIG. 1. The output or load winding 14 of the variable inductor 10 is connected in parallel with a capacitor 25 to form a resonant or tank circuit tuned to the output frequency of the inverter 22. The load winding 14 has a center tap which is connected by a line 26 to an output terminal 27. The other output terminal 28 is connected through diodes 29 and 30 to taps 31 and 32 on the winding 14 so that the output is a direct current voltage. A filtering capacitor 33 is connected across the output terminals 27 and 28.

The output voltage across the terminals 27 and 28 is applied to an output voltage sensing circuit 34 by lines 35 and 36. The output voltage sensing circuit 34 may be any conventional type which compares the output voltage with a reference voltage and produces a control voltage representative of any deviation of the output voltage from the reference. It may, for example, be similar to that disclosed in my U.S. Pat. No. 3,409,822. The output of the sensing circuit 34 is applied by lines 37 and 38 to the inverter 22 and serves to vary the frequency of the output waveform of the inverter 22 if the output voltage differs from the reference voltage established in the sensing circuit 34.

A starting circuit 39 is coupled across the lines 23 and 24 by lines 40 and 41. The output of the starting circuit is connected to the lines 37 and 38 and hence to the inverter 22. The purpose of the starting circuit is to permit the parametric circuit to be self-starting by reducing the output frequency of the inverter 22 to increase its input current so that sufficient coupling is established between the windings 13 and 14 to initiate oscillations in the parametric device in the manner described in the aforementioned application Ser. No. 589,780. The starting circuit 39 may simply comprise a capacitor and diode for this purpose as will be obvious to those skilled in the art. Of course, other starting mechanisms could be provided in place of the starting circuit 39 if desired.

The operation of the circuit shown in FIG. 2 is basically similar to that disclosed in the aforementioned applications Ser. Nos. 589,780 and 821,933. The primary difference, of course, is that the frequency of the input to the parametric device, and the frequency to which the tank circuit made up of the winding 14 and capacitor 41 is tuned, are much higher than conventional power frequencies. The use of such a higher frequency permits the size of the core and the number of turns of the windings to be greatly reduced. Since the magnitude of the output voltage of the parametric device is dependent upon the paraneters of the resonant circuit and upon the input frequency, it can be seen that the output voltage can be maintained constant by use of the sensing circuit 34 which controls the frequency of the output of the inverter 22. Consequently, the regulator of the present invention is insensitive to changes in line frequency and is also insensitive to changes in load or any other parameter which might effect the output voltage. This is accomplished without losing any of the advantages, such as bilateral filtering, which are inherent in the use of a parametric regulator of the type herein disclosed. Although the regulator is illustrated as operating from an alternating current input, it will be obvious to those skilled in the art that the input voltage could be DC in which case the rectifier 20 and capacitor 21 would not be necessary.

Turning now to FIG. 3, another embodiment of the regulator according to the present invention is illustrated. In this embodiment, an unregulated or substantially unregulated AC input voltage is applied to input terminals 48 and 49 which are connected to a rectifier and filter 50. The output of the rectifier and filter 50 are connected to the input of an inverter 51 the output of which is connected to the control winding 52 of a variable inductor 53, preferably of the type described in the aforementioned patent. The load winding 54 of the inductor 53 is connected with a capacitor 55 to form the tank circuit of a parametric device such as that disclosed in the aforementioned patent application Ser. No. 589,780. The output of this tank circuit is applied to a rectifier and filter 56 which is connected to output terminals 57 and 58.

A control amplifier and oscillator 59 is connected across the output terminals 57 and 58. This control amplifier and oscillator serves to convert the DC output voltage into a series of pulses, the frequency of the pulses being dependent upon the amplitude of the output DC voltage. Such a circuit is conventional, for example, in digital volt meters, and need not be discussed further here. The output of the control amplifier and oscillator 59 is fed to a variable frequency drive and delay logic 60 the output of which is a control signal which controls the operation of the inverter 51.

The output of the variable frequency drive and delay logic 60 causes the output of the inverter 51 to vary in frequency in response to variations in the voltage appearing across output terminals 57 and 58. In other words, the operation of the conducting elements in the inverter 51 is controlled by the pulses generated in the control amplifier and oscillator 59 as modified in the variable frequency drive and delay logic 60. The purpose of the latter circuit is to produce a train of pulses that correspond in frequency with those produced by the control amplifier and oscillator 59 but whose triggering edges are delayed so that one of the conducting elements in the inverter 51 is completely turned off before the alternate conducting element is turned on so as to eliminate the short circuit conditions discussed previously. As will be apparent, the elements 59, 60 and 51 of FIG. 3 are equivalent in operation to the elements 34 and 22 of FIG. 2 with the additional feature that the pulses delivered to the inverter to control its operation are delayed in a desired manner. In all other respects, the operation of the systems of FIG. 2 and FIG. 3 are similar.

Figure 4:
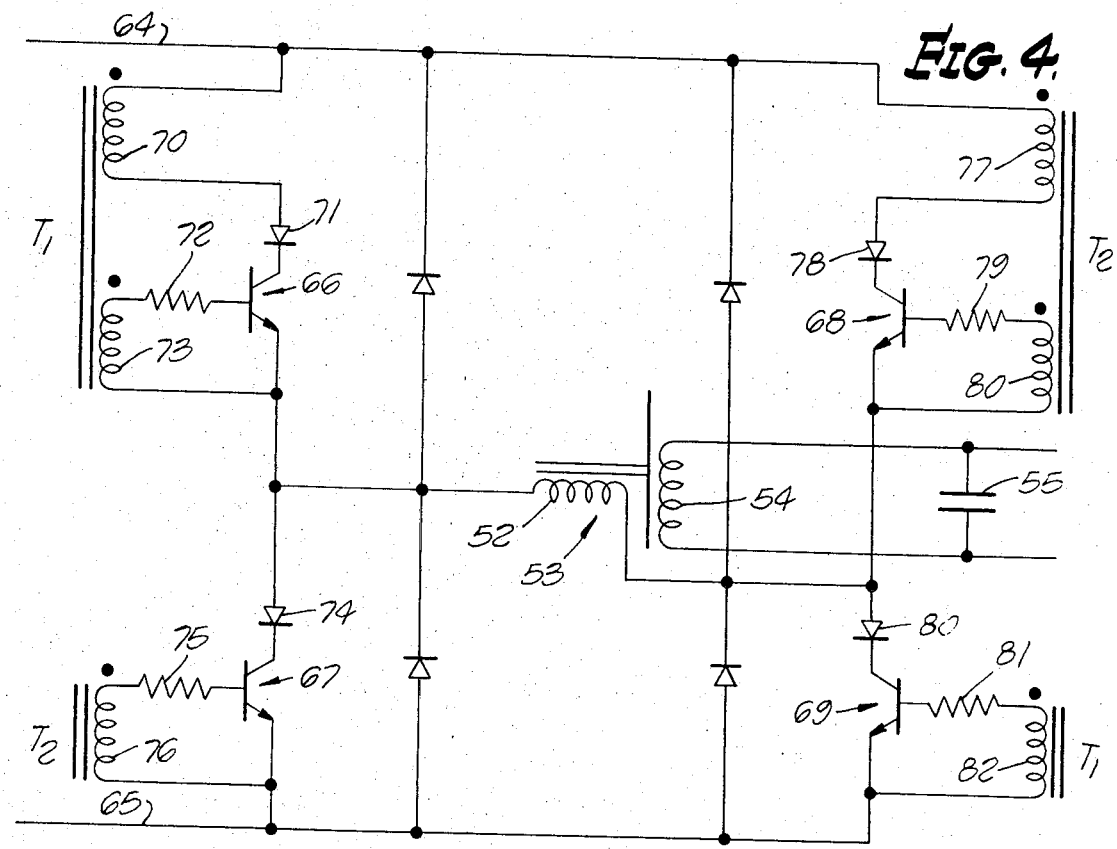
FIGS. 4 and 5 are schematic circuit diagrams of portions of the embodiment of FIG. 3.
Figure 5:
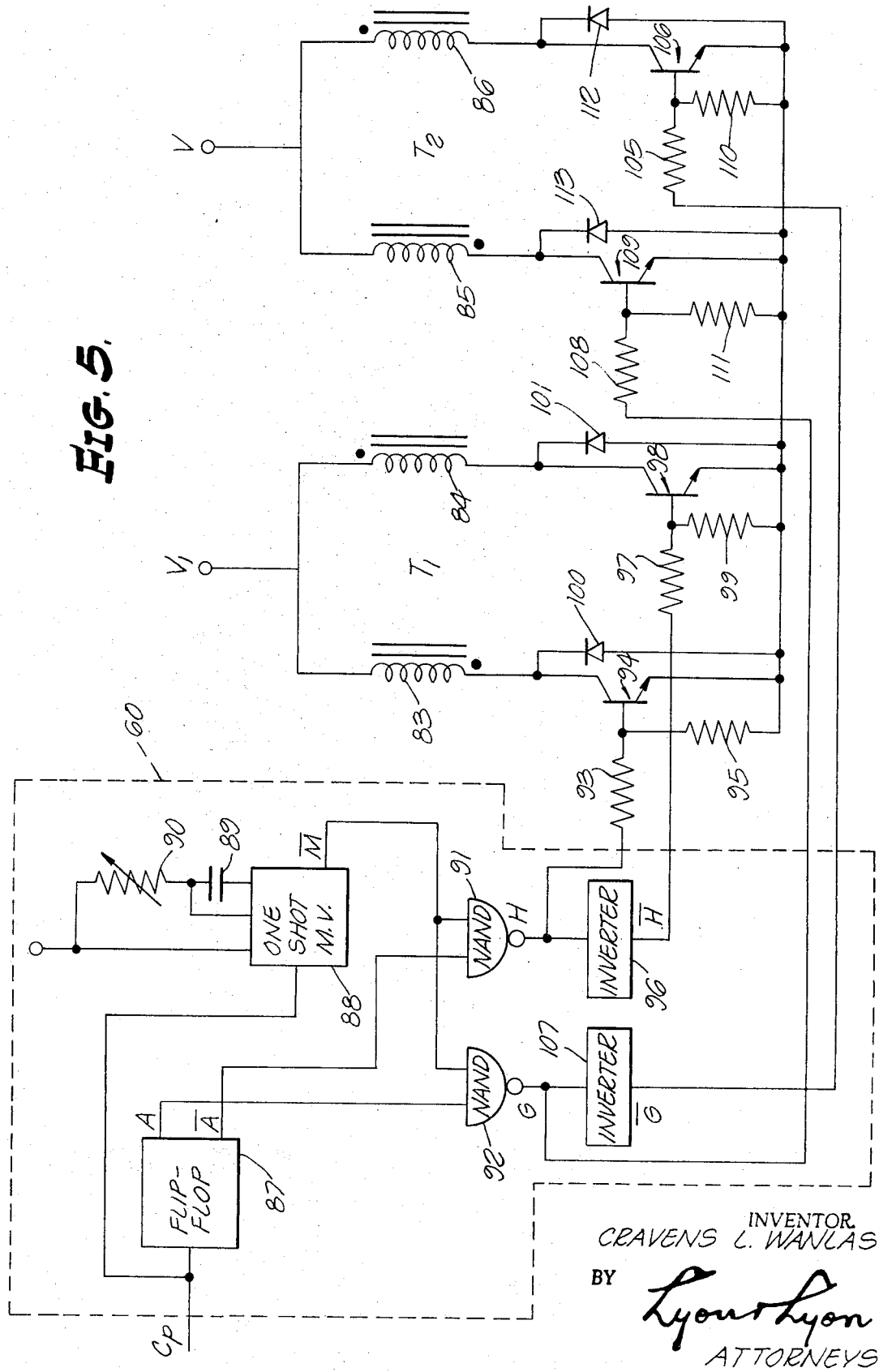

Turning now to FIGS. 4 and 5, there is illustrated suitable circuitry for use in the system of FIG. 3. FIG. 4 illustrates in schematic form the construction of the inverter 51 of FIG. 3. The DC voltage from the rectifier and filter 50 is applied along lines 64 and 65 across a bridge circuit including four NPN transistors 66, 67, 68 and 69. The transistor 66 is connected to the line 64 through a first winding 70 of a transformer $T_1$ and a diode 71. The base of the transistor 66 is connected to its emitter through a resistor 72 and a second winding 73 of the transformer $T_1$. The emitter of the transistor 66 is also connected to one end of the control winding 52 of the parametric inductor 53. This point is also connected through a diode 74 to the collector of the transistor 67. The base of the transistor 67 is connected to its emitter through a resistor 75 and a first winding 76 of a transformer $T_2$. The emitter is also connected to the line 65.

The other two arms of the bridge are formed in a similar manner. The collector of the transistor 68 is connected to the line 64 through a second winding 77 on the transformer $T_2$ and a diode 78. The base of the transistor 68 is connected to its emitter through a resistor 79 and a third winding 80 on the transformer $T_2$. The emitter of the transistor 68 is also connected to the other side of the control winding 52 of the parametric inductor 53. This latter point is also connected through a diode 80 to the collector of the transistor 69. The base of this transistor is connected through a resistor 81 and a third winding 82 on the transformer $T_1$. Each of the arms of the bridge are shunted by a diode. The polarity of the various windings of the transformers $T_1$ and $T_2$ are indicated by the appropriate dots.

As will be understood by those skilled in art, the transistors 66 and 69 and the transistors 68 and 67 are provided with a regenerative or demand type positive feedback system, i.e., one that is not dependent on an external circuit once it is initially triggered and consequently takes less power drive and removes non-symmetrical characteristics. Assuming that a pulse is applied to the primary winding of the transformer $T_1$, a voltage will be induced in the secondary winding 73 with the result that the base-emitter bias of the transistor 66 will be increased and the transistor will begin to conduct. Similarly, the transistor 69 will begin to conduct with the result that a current passes through the secondary winding 70 of transformer $T_1$, the diode 71, the transistor 66, the control winding 52 of the parametric inductor 53, the diode 80 and the transistor 69. Passage of current through the winding 70 of the transformer $T_1$ will cause a greater voltage to be induced in the winding 73 and 82 with the result that the transistor 66 and 69 will increase conduction. This regeneration will continue until the demand from the control winding 52 of the inductor 53 decreases.

In this regard, it must be remembered that the operation of the parametric inductor 53 is bilateral, that is, a change in the current passing through the load winding 54 will effect the self-inductance of control winding 52 in the same manner that a current passing through the control winding 52 will effect self-inductance of the load winding 54. Thus, when the inductance of the control winding 52 begins to increase, a point will be reached when its impedance causes the current flowing through the circuit previously described to decrease with the result that the transistors 66 and 69 will eventually become non-conducting. Of course, the transformer $T_1$ must be designed so that it will stay on until triggered off, that is, the time constant of the transformer circuit (i.e., the length of time positive regeneration can take place) must be greater than the period at which the parametric circuit is to operate. The circuit including the transistors 68 and 67 operates in the same fashion through the transformer $T_2$ and drives a current through the control winding 52 of the parametric inductor 53 in the opposite direction so that an alternating current is delivered to the control winding.

As pointed out previously, it is necessary for efficient and safe operation that the transistors 66 and 69 be cut off before the transistors 68 and 67 become conductive and vice-versa. As has also been explained, it is desirable to introduce a time delay between cut-off of one set of transistors and cut-on of the other set because of the slow response time of conventional transistors and the desirability of using the latter for reasons of economy. FIG. 5 illustrates a circuit suitable for controlling the triggering on and off of the transistors in the inverter circuit of FIG. 4.

As illustrated in FIG. 5, the transformer $T_1$ has two primary windings 83 and 84, the windings being poled in opposite directions so that when a current passes through the winding 83 the transistors 66 and 69 will be rendered conducting and when a current passes through the winding 84, the transistors will be rendered non-conducting. Similarly, the transformer $T_2$ has two primary windings 85 and 86 which are also poled in opposite directions and which serve to trigger the transistors 68 and 67 on and off respectively.

As shown in FIG. 5, the variable frequency drive and delay logic circuit 60 includes a flip-flop 87 which receives the output of the control amplifier and oscillator 59 and alternately produces a pulse at its A and $\overline{A}$ output in response thereto. As will be recalled, the frequency or repetition rate of the pulses from the control amplifier and oscillator 59 is dependent upon the magnitude of the voltage appearing across the output terminals 57 and 58. The pulses from the control amplifier and oscillator 59 are also fed to the input of a one shot multivibrator 88 which produces a zero output at the output M in response thereto for a time determined by a time constant circuit comprising a capacitor 89 and a variable resistor 90, the resistor being variable in order to vary the time constant. The output $\overline{M}$ of the multivibrator 88 is applied to a first input of a NAND gate 91, the other input of this gate being connected to the output $\overline{A}$ of the flip-flop 88. The output $\overline{M}$ of multivibrator 88 is also applied to a second NAND gate 92, the other input of which is connected to the A output of the flip-flop 87. The output of the NAND gate 91 is applied through a resistor 93 to the base of a transistor 94 connected in circuit with the primary winding 83 of the transformer $T_1$ and biased by a base resistor 95.

The output of the NAND gate 91 is also fed to an inverter 96, the output of which is connected through a resistor 97 to the base of a transistor 98 which is connected in circuit with the primary winding 84 of the transformer $T_1$ and which is biased by a resistor 99. The emitter-collector path of the transistor 94 is shunted by a diode 100. Similarly, the collector-emitter path of the transistor 98 is shunted by a diode 101.

Figure 6:
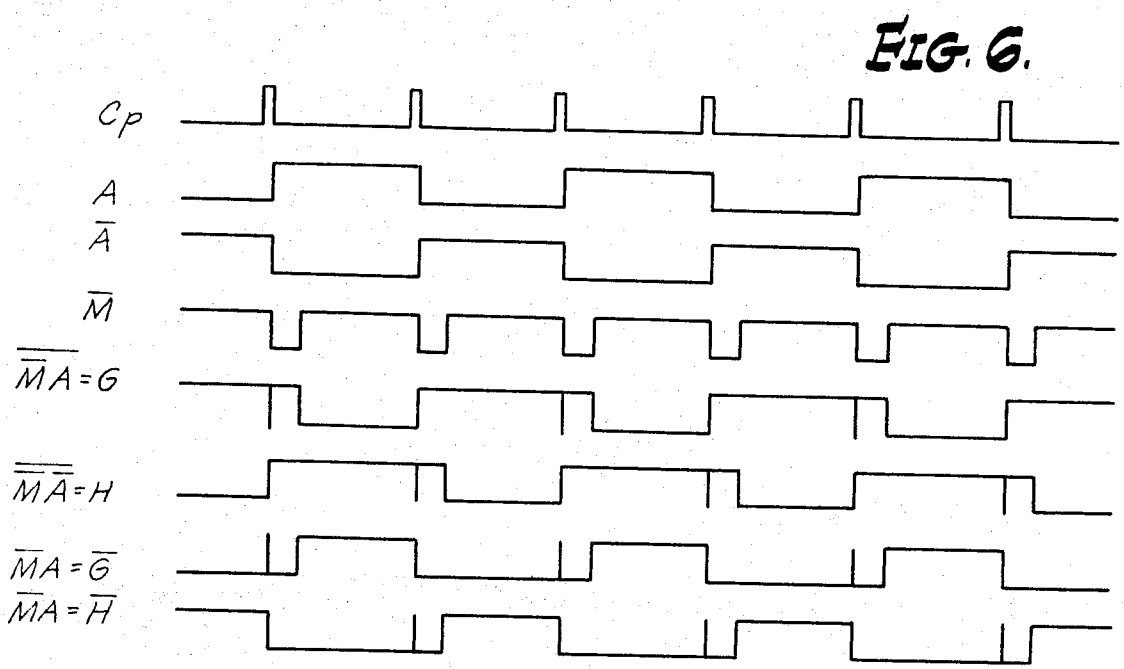
FIG. 6 is a timing diagram showing the various waveforms present in the embodiment of FIGS. 3, 4 and 5.

The output of the NAND gate 92 is coupled through a resistor 108 to the base of a transistor 109 which is connected in circuit with the primary winding 85 of the transformer $T_2$. The output of the NAND gate 92 is also connected to an inverter 107 whose output is coupled through a resistor 105 to the base of a transistor 106 which is connected in series with the primary winding 86 of transformer $T_2$. Transistors 106 and 109 are biased by resistors 110 and 111 respectively and have their collector-emitter paths shunted by diodes 112 and 113. For ease in discussion the output of the NAND gate 91 will be referred to as H, the output of the inverter 96 as $\overline{H}$, the output of the NAND gate 92 as G, and output of the inverter 107 as $\overline{G}$, reference being made to these outputs on the timing diagram of FIG. 6.

It is believed that the operation of the circuits of FIGS. 4 and 5 will be apparent to those skilled in the art, particularly when viewed with the timing diagram of FIG. 8. When a pulse $C_P$ is received from the control amplifier and oscillator 59, assume that the flip-flop 87 produces an output pulse at the output A but not at the output $\overline{A}$. Of course, the next pulse $C_P$ will reverse this relationship. The pulse $C_P$ will also cause the multivibrator 88 to produce a pulse at the output $\overline{M}$ after a delay that is determined by the parameters of the capacitor 89 and resistor 90 of the time constant network.

Assume that the transistors 66 and 69 of FIG. 4 are conducting when the aforementioned pulse $C_P$ is received by the flip-flop 87. Since there is now no signal at either input of the NAND gate 91, its output immediately goes positive with the result that the transistor 94 is rendered conductive and a current passes through the primary winding 83 of the transformer $T_1$. This current in the primary winding 83 poled as shown causes a current to be induced in the secondary windings 70, 73 and 82 in a direction opposite to the current that was previously flowing therein with the result that the transistors 66 and 69 are cut off. Because of the characteristics of these transistors, as previously mentioned, they will continue to conduct for some period after the triggering signal is received.

Upon the occurrence of a pulse at the output $\overline{M}$ of the multivibrator 88, the NAND gate 92 sees coinciding inputs and consequently the inverter 107 puts out a positive output pulse $\overline{G}$. This pulse causes the transistor 106 to be rendered conductive with the result that a current passes through the primary winding 86 of the transformer $T_2$. This causes a current to be induced in the secondary windings 77, 80 and 76 of the transformer $T_2$ with the result that the transistors 68 and 67 are rendered conductive. On the occurrence of the next pulse $C_P$, the flip-flop 87 will produce a positive pulse at output $\overline{A}$ and a zero at output A. Accordingly, the output of the NAND gate 92 goes to zero and applies a positive pulse to the base of the transistor 109 causing it to become conductive and turning off the transistors 68 and 67.

The NAND gate 91 operates similarly to the NAND gate 92. Consequently, a short time after the transistors 68 and 67 are turned off, the time depending on the time constant of the network 89, 90, the output H of the NAND gate 91 will go to zero with the result that the output H of the inverter 96 goes positive, the transistor 98 is biased into conduction, current flows through the primary winding 84 of the transformer $T_1$ inducing a current in the secondary windings 70, 73, and 82 of the transformer $T_1$ and causing the transistors 66 and 69 to begin conduction.

When the next pulse $C_P$ is received by the flip-flop 87, the output of the flip-flop will switch from $\overline{A}$ to A with the result that the output H of the NAND gate 91 will immediately go positive. This causes the transistor 94 to be biased into conduction and the transistor 98 to be turned off. Current flowing through the winding 83 of the transformer $T_1$ as a result of the conduction of the transistor 94 induces a current in the windings 70, 73 and 82 of the transformer $T_1$ in a direction such that the transistors 66 and 69 are switched off. This operation continues, the frequency at which the transistors 66, 69 and 68, 67 are switched being dependent upon the voltage developed across the output terminals 57 and 58 of FIG. 3.

From the foregoing description, it can be seen that a highly accurate, inexpensive, simple, and highly efficient voltage regulator has been provided. It should be understood that the broad principles of the invention do not require the use of the particular control circuitry illustrated, these illustrations being only for the purposes of clarity. The present embodiments of the invention are therefore to be considered in all respects as illustrative and not restrictive.

What is claimed is:

1. A voltage regulator comprising:
   terminal means for connection to a source of unregulated voltage;
   an inverter coupled to said terminal means for producing output pulses having a frequency higher than the frequency of said unregulated voltage, said inverter comprising first and second conducting means adapted to be alternately caused to conduct or not conduct;
   a parametric device employing an inductor comprising a load winding on core means, a capacitor, means connecting said inductor and said capacitor in an energy storing tank circuit, and means for varying the self-inductance of said inductor at twice the frequency of the output of the inverter, said means comprising a control winding wound on said means such that flux from said control winding does not cut said load winding and coupled to said inverter, said parametric device providing complete isolation of the output from the control winding, the output waveform being determined by the tank circuit;
   an output circuit coupled to said tank circuit for delivering an output voltage;
   first means coupled to said output circuit for producing pulses having a repetition rate corresponding to the magnitude of said output voltage;
   logic circuit means coupled to said first means and to said inverter for alternately causing said first and second conducting means to conduct or not conduct in response to said pulses from said first means, said logic circuit means comprising signal producing means for producing a first signal which causes said first conducting means to conduct, a second signal which causes said first conducting means to cease conducting, a third signal which causes said second conducting means to conduct and a fourth signal which causes said second conducting means to cease conducting, and
   a one shot multivibrator coupled to receive the pulses from said first means and having a variable time constant network providing delay means for delaying the production of said third signal until said first conducting means have ceased conducting and for delaying said first signal until said second conducting means have ceased conducting.

2. A voltage regulator comprising:
   terminal means for connection to a source of unregulated voltage;
   an inverter coupled to said terminal means for producing output pulses having a frequency higher than the frequency of said unregulated voltage, said inverter comprising first and second conducting means consisting of transistors adapted to be alternately caused to conduct or not conduct;
   a parametric device employing an inductor comprising a load winding on core means, a capacitor, means connecting said inductor and said capacitor in an energy storing tank circuit, and means for varying the self-inductance of said inductor at twice the frequency of the output of the inverter, said means comprising a control winding wound on said means such that flux from said control winding does not cut said load winding and coupled to said inverter, said parametric device providing complete isolation of the output from the control winding, the output waveform being determined by the tank circuit;
   an output circuit coupled to said tank circuit for delivering an output voltage;
   first means coupled to said output circuit for producing pulses having a repetition rate corresponding to the magnitude of said output voltage;
   logic circuit means coupled to said first means and to said inverter for alternately causing said first and second conducting means to conduct or not conduct in response to said pulses from said first means, said logic circuit means comprising signal producing means for producing a first signal which causes said first conducting means to conduct, a second signal which causes said first conducting means to cease conducting, a third signal which causes said second conducting means to conduct and a fourth signal which causes said second conducting means to cease conducting, wherein said signal producing means include first and second transformers each having a pair of oppositely poled primary windings and a secondary winding, the secondary winding of each transformer being coupled in the base circuit of a corresponding transistor; and
   delay means for delaying the production of said third signal until said first conducting means have ceased conducting and for delaying said first signal until said second conducting means have ceased conducting.

3. The regulator of claim 2 wherein said transformers are each provided with a second secondary winding, said secondary windings being coupled to corresponding transistors to provide said transistors with regenerative feedback.

* * * * *